Aug. 27, 1957 R. L. DUNN 2,804,130
ELASTOMER PRODUCTS
Filed May 13, 1954 2 Sheets-Sheet 1

INVENTOR
Richard Lawrence Dunn
by Berry T. Rauber
his attorney

Aug. 27, 1957  R. L. DUNN  2,804,130
ELASTOMER PRODUCTS
Filed May 13, 1954  2 Sheets-Sheet 2

INVENTOR
Richard Lawrence Dunn
by Benj. T. Rauber
his attorney

United States Patent Office 2,804,130
Patented Aug. 27, 1957

2,804,130

ELASTOMER PRODUCTS

Richard Lawrence Dunn, Wallasey, England, assignor to Dunlop Rubber Company Limited, London County, England, a British company Application May 13, 1954, Serial No. 429,605

12 Claims. (Cl. 155—182)

This invention relates to reversible cushions of sponge rubber or other elastomers constructed by joining together two identical mouldings. "Elastomer" is a generic term for all organic, elastic polymers of either natural or synthetic origin and includes, natural rubber, synthetic rubber, elastic vinyl resin compositions, elastic polyurethane resins and other rubber-like organic materials. In the following description "rubber" is used as an illustrative example of elastomers.

Such cushions are generally of substantially rectangular form and each half consists of a base portion, a peripheral wall and a network of ribs defining a number of cavities. The two halves are united with their cavitied faces in contact and their peripheral walls in alignment to form a continuous shell. Usually the arrangement of the ribs and cavities in the two halves is such that they also are in alignment, though it has been proposed to form the mouldings in such a manner that in one direction of the finished cushion, but not in the other, the ribs of one moulding are displaced relative to those of the other.

It is an object of the present invention to provide moulds for the production of mouldings for reversible elastomer or sponge rubber cushions, particularly of substantially rectangular form, which yield mouldings having an arrangement of ribs and cavities such that when pairs of mouldings from the same mould are assembled face to face the ribs and cavities in the two mouldings are necessarily displaced relative to each other.

A further object of the invention is to provide mouldings for reversible sponge rubber or other elastomer cushions in which the arrangement of the ribs and cavities is such that when two such mouldings are assembled face to face the ribs of each moulding extend across the cavities of the other moulding.

A further object is to produce reversible sponge rubber or other elastomer cushions made of such mouldings. Such cushions are soft but are yet sufficiently resilient to return to normal shape and size when the load is removed.

According to the present invention, a sponge-rubber or other elastomer half-cushion containing a regular network of ribs defining a regular pattern of cavities extending inwardly from its base plane, and having at least one plane of outline symmetry normal to its base plane and at least one plane of cavity-pattern symmetry normal to its base plane, has its ribs and cavities so arranged that no plane of cavity-pattern symmetry coincides with the corresponding plane of outline symmetry.

The words "plane of outline symmetry" are used here and in the claims to denote any plane of symmetry which the half-cushion possesses if the cavities are ignored. The words "cavity pattern symmetry" are used here and in the claims to denote any plane to which the pattern is symmetrical if the outline of the half cushion and the extent of the pattern are ignored.

In general half-cushions in accordance with the invention have a plane of cavity-pattern symmetry corresponding with each plane of outline symmetry but not coincident therewith, so that the cavity pattern is asymmetric with respect to each of the planes of outline symmetry, i. e., the pattern on one side of each of these planes is not the mirror image of the pattern on the other side.

Thus substantially oblong rectangular and elliptical half-cushiones will have two planes of outline symmetry and two of pattern symmetry while substantially square cushions will have four planes of each type. Preferably the pattern arrangement is such that each plane of pattern symmetry is parallel to a plane of outline symmetry.

The cavities may be of any desired cross-section, but it is preferred that they should be of circular, square, hexagonal, or similar cross-section, i. e. that they should be symmetrical about an axis of symmetry.

Various forms of cavity pattern having the above features may be employed; for instance, the cavities may be so arranged that each non-peripheral cavity has either four or six nearest neighbours.

With oblong rectangular half-cushions, and other half-cushions having only two planes of outline symmetry, the cavity pattern may be and preferably is such as to give reversible cushions in which it is necessarily the centres of the cavities in each half that are aligned with the intersections of the ribs in the other half. In order to achieve this, the rows of cavities in each half-cushion should be arranged at 45° to each of the two planes of cavity-pattern symmetry, so that each non-peripheral cavity has four nearest neighbours, and the point standing in miror-image relation to each non-peripheral intersection in the network of ribs, with respect to each of the two planes of outline symmetry, should be located centrally within one of the cavities (that is to say, should be located on a cavity axis normal to the base of the half-cushion). The line of intersection of the two planes of outline symmetry will then coincide with a line midway between adjacent rib intersections.

In addition to the half-cushions defined above and described in more detail below, the invention includes moulds for the production of sponge-rubber half-cushions having moulding spaces corresponding to the half-cushions, and also includes reversible sponge-rubber cushions produced by uniting the half-cushions in pairs with the base planes in contact and the edge walls in alignment.

The invention will be described in more detail with reference to the accompanying drawings, which illustrate diagrammatically a number of cushions in accordance with the invention.

Figure 1 is a plan view of a complete cushion, with part of one corner broken away to show the interior construction, Figure 2 is a transverse cross-section on the line II—II of Figure 1, and Figure 3 is a longitudinal cross-section on a line III—III of Figure 1.

The cushion consists of two mouldings 1, 2 having ribs 3, 4 intersecting at 5, 6 and forming cavities 7, 8. The rows in which the cavities lie are each inclined at an angle of 45° to the major axes AA, BB of the half-cushions, the cavity patterns on opposite sides of the axes are asymmetric, and the line of intersection of the two planes of outline symmetry of each half-cushion coincides with a line mid-way between adjacent rib intersections.

Figure 1:
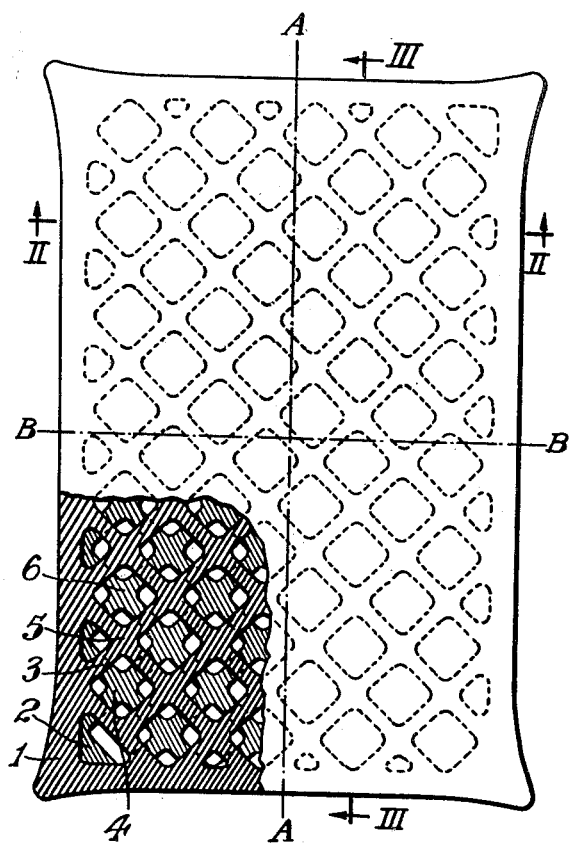
Figure 3:
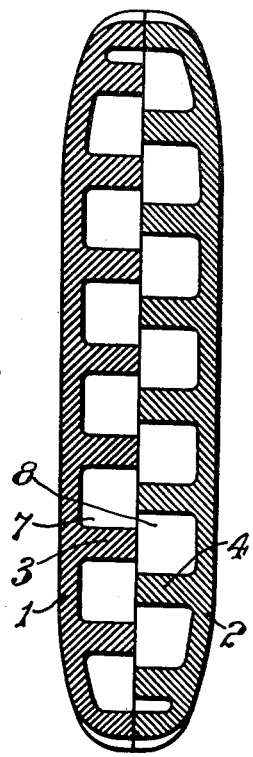
Figure 2:
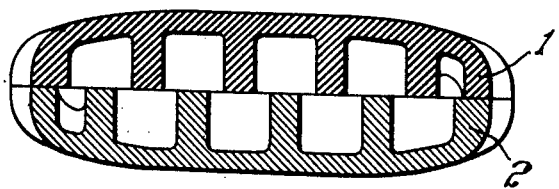
Figure 4:
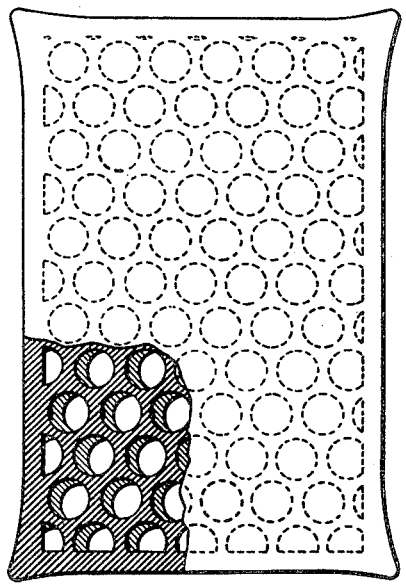
Figure 4 is a plan view of a similar cushion in which the cavities are of circular cross-section and lie in rows which make angles of 30° and 60° with the major and minor axes respectively.
Figure 5:
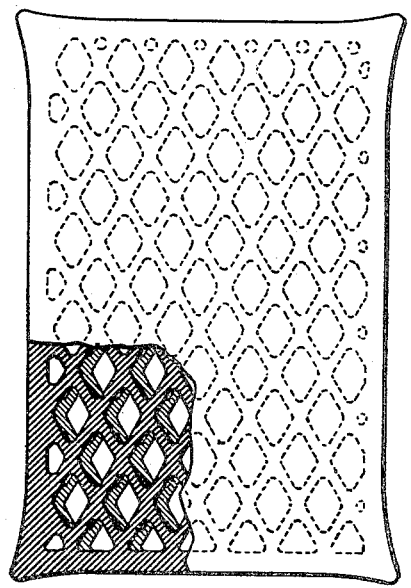
Figures 5 and 6 are plan views of cushions similar to Figure 4 but having diamond shaped and hexagonal cavities respectively.
Figure 6:
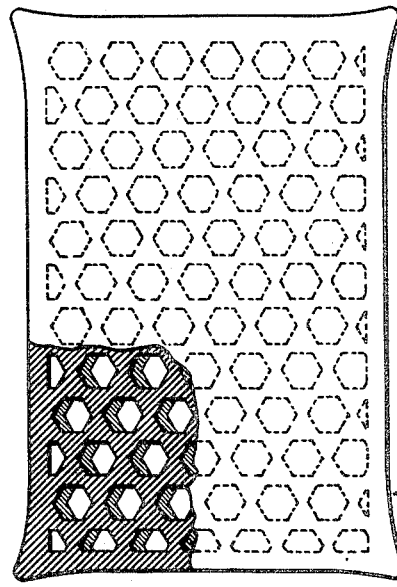

It will be noted that in the cushions of Figures 4 to 6, wherein the rows in which the cavities lie do not bisect the angle between the major and minor axes, the points of intersection of the ribs are not aligned with the centres of the cavities.

Having described my invention, what I claim is:

1. A sponge-rubber half-cushion containing a regular network of ribs defining a regular pattern of cavities extending inwardly from a base plane, and having at least one plane of outline symmetry normal to said base plane and at least one plane of cavity-pattern symmetry normal to said base plane, in which the ribs and cavities are so arranged that no plane of cavity-pattern symmetry coincides with the corresponding plane of outline symmetry.

2. A half-cushion according to claim 1, having only two planes of outline symmetry, these planes intersecting at right angles, and two corresponding planes of cavity-pattern symmetry.

3. A half-cushion according to claim 2, in which the cavities are so arranged that each non-peripheral cavity has six nearest neighbours.

4. A half-cushion according to claim 2, in which the cavities are arranged in straight rows lying at 45° to each of the two planes of cavity-pattern symmetry, so that each non-peripheral cavity has four nearest neighbours, and in which the point standing in mirror image relation to each non-peripheral intersection in the network of ribs, with respect to each of the two planes of outline symmetry, is located centrally within one of the cavities.

5. A half-cushion according to claim 2, the base plane of which has a substantially rectangular outline and has a length greater than its breadth.

6. A half-cushion according to claim 3 the base plane of which has a substantially rectangular outline and has a length greater than the breadth.

7. A half-cushion according to claim 4 the base plane of which has a substantially rectangular outline and has a length greater than the breadth.

8. A reversible sponge-elastomer cushion comprising two halves of identical outline united on a common base plane, each half cushion containing a regular network of ribs defining a regular pattern of cavities extending inwardly from said plane and having at least one plane of outline symmetry normal to said base plane and at least one plane of cavity-pattern symmetry normal to said base plane in which the ribs and cavities are so arranged that no plane of cavity-pattern symmetry coincides with the corresponding plane of outline symmetry.

9. The reversible sponge-elastomer cushion of claim 8 the ribs of one half of the cushion join at the cavity of the other half of the cushion.

10. The reversible sponge rubber cushion of claim 8 in which each of said halves has only two planes of outline symmetry, these planes intersecting at right angles and two corresponding planes of cavity-pattern symmetry.

11. The reversible sponge rubber cushion of claim 10 in which the cavities are so arranged that each non-peripheral cavity has six nearest neighbours.

12. The half-cushion of claim 10 in which the cavities are arranged in straight rows lying at 45° to each of the two planes of cavity-pattern symmetry so that each non-peripheral cavity has four nearest neighbours at which the point of intersection of the ribs in one half-cushion is located centrally of one of the cavities of the other half-cushion.

References Cited in the file of this patent

UNITED STATES PATENTS

| | | |
|---|---|---|
| 2,180,304 | Minor | Nov. 14, 1939 |
| 2,364,036 | MacKay et al. | Nov. 28, 1944 |
| 2,499,965 | Miller | Mar. 7, 1950 |
| 2,604,663 | Talalay | July 29, 1952 |
| 2,674,752 | Berman | Apr. 13, 1954 |

FOREIGN PATENTS

| | | |
|---|---|---|
| 392,550 | Great Britain | May 15, 1933 |
| 683,754 | Great Britain | Dec. 3, 1952 |
| 1,035,319 | France | Apr. 15, 1953 |